Nov. 24, 1931.    A. C. W. ALDIS    1,833,548
APPARATUS FOR USE IN CONNECTION WITH PHOTOGRAPHIC AERIAL SURVEYS
Filed Feb. 6, 1930    7 Sheets-Sheet 6

A. C. W. Aldis
INVENTOR

By: Marks & Clark
Attys.

Nov. 24, 1931.  A. C. W. ALDIS  1,833,548
APPARATUS FOR USE IN CONNECTION WITH PHOTOGRAPHIC AERIAL SURVEYS
Filed Feb. 6, 1930   7 Sheets-Sheet 7

Patented Nov. 24, 1931

1,833,548

UNITED STATES PATENT OFFICE

ARTHUR CYRIL WEBB ALDIS, OF BIRMINGHAM, ENGLAND

APPARATUS FOR USE IN CONNECTION WITH PHOTOGRAPHIC AERIAL SURVEYS

Application filed February 6, 1930, Serial No. 426,398, and in Great Britain February 19, 1929.

In the method of making photographic aerial surveys, the method to which this invention is related consists in taking from an aeroplane a succession of photographs of the ground beneath. If the axis of the camera could at all times be held in a truly vertical position, the photographs obtained would be of immediate use in the development of a map of the country covered by the photographs. But as it is impossible, owing to unavoidable variations in the level of the aeroplane, to keep the camera axis truly vertical at all times, it is necessary (according to the procedure with which this invention is concerned) to take from the original photographs another set of photographs in which the error or distortions due to variations in the camera axis are corrected, the corrected photographs being as nearly as possible such as would have been obtained in the first instance had the camera axis been vertical at all times. The object of the present invention is to provide improved means whereby in a simple and satisfactory manner the angle of tilt of the camera can be readily determined, and corrected photographs can readily be obtained from the original photographs. (Wherever the term "corrected photograph" is employed in the following description and claims it is used in the sense above described.)

The principal features of my invention will readily be understood from a description of a simple example of the procedure which I have devised for obtaining corrected photographs, and attention will be concentrated in the first instance on a single photograph of flat country containing a number of features which have already been correlated by, for example, a theodolite survey, termed the "ground control". Let it be supposed that four such features are known (this being a convenient number to employ) and that the angles contained by lines joining these features are known, I draw on a transparent screen four lines parallel with such lines, and parallel to each line I draw a number of other closely associated lines so that on the screen there are four groups of closely ruled parallel lines. On the photograph, the same four features are also identified, and joined by straight lines. Preferably these lines are formed by thin marks scratched on the photograph, and the fine lines so formed are illuminated by a strong light placed behind the photograph.

For producing the corrected photograph I employ an apparatus comprising two main parts, namely, a projector on which the original photograph is mounted, and a camera by which the desired corrected photograph is obtained. The axes of the projector and camera are relatively movable about a certain central point termed the view point. It is convenient (though not essential) to keep the camera axis fixed, and arrange for the projector axis to be movable in a horizontal or other plane about the view point on the camera axis. It is moreover essential to make provision for locating the photographic lens in the camera so that its nodal point coincides with the view point. If the original photograph were taken with a camera having its axis truly vertical, then in reproducing this photograph the axis of the projector would be arranged coincident with the axis of the reproducing camera. But in general, as already stated, the axis of the camera on the aeroplane is not truly vertical, and to correct the distortion which appears in the photograph from this cause, it is necessary to incline the axis of the projector relatively to the axis of the reproducing camera in order that the distortion may be neutralized in the corrected photograph. The problem which arises in this procedure is that of finding quickly and conveniently the proper position in which the original photograph should be placed relatively to the view point in order that the distortion may be properly corrected.

In the simple instance at present being described, I place between the original photograph (which is mounted on the projector at the proper focal distance from the view point, and which has previously been prepared by the drawing on it of lines or slits as already mentioned) and the view point of the reproducing camera, the screen carrying the parallel lines. This screen is mounted in a holder which whilst keeping the plane of the screen accurately parallel with the plane containing the plate or paper on which the corrected photograph is to be taken, permits the screen to be rotated or otherwise moved in its own plane. Before the required correlation of the original photograph and screen can be obtained, it is, however, first necessary to ensure that the said photograph is fixed in a proper position on the projector. To enable this to be done, I arrange that in the taking of the original photograph a datum mark shall appear on the photograph corresponding to the axis of the camera with which the photograph was taken. When mounting the photograph on the projector the first procedure is to adjust the photograph until the datum mark coincides accurately with the axis of the projector, which can be marked by cross wires fixed on the projector, or by any other suitable means. When this adjustment has been properly made, rotation of the photograph about the axis of the projector will not produce any movement of the datum mark. The adjustment can readily be made by arranging the datum mark on the photograph to coincide exactly with a reference mark on the glass support for the photograph. At the same time the photograph is also adjusted to bring it into correct focal relation with the view point above mentioned.

Having centred and adjusted the photograph as above described, the projector and screen are independently moved until, by various trials, the straight lines or slits on the photograph all appear accurately parallel with the lines on the screeen. In making this adjustment a suitable sighting device must be employed producing to the observer the effect of looking at the photograph through a fine pin hole accurately located at the view point. Where a magnifying sighting device is employed I mount this on gimbals at its forward end whose centre is located at the view point, and thus fulfill the condition in every case that the observer's equivalent view point is the "view point". When this condition of apparent parallelism is attained, the photograph on the projector is in the proper position for obtaining a properly corrected photograph.

It will be seen from the foregoing that the essential feature of my invention resides in the use of a screen bearing parallel lines which are correlated with objects in the original photograph by angular measurements obtained in the ground survey, termed the "ground control".

For the purpose of elucidating the essential feature of my invention, I have in the foregoing considered the simplest example of a photograph of flat country. To enable corrected photographs of hilly country to be obtained, I employ more than one screen, two being usually a convenient number. As before, I first obtain by means of a ground survey the angular relationship of four objects on the photograph. These will lie at the corners of a quadrilateral figure as already described, but the elevations of the corner positions will usually differ from each other. Two of the lines containing one angle of the figure will however lie in one plane, and the other lines containing the opposite angle will lie in another plane. I therefore employ a pair of screens. On one of them I draw two groups of lines each parallel with one pair of adjacent lines on the figure, and on the other I draw two groups of lines each parallel with the other pair of adjacent lines, and I secure these two screens in a suitable cylindrical holder so that its axis is correlated to the two sets of parallel lines in exactly the same way that the vertical direction is correlated to the corresponding lines joining the objects forming the original ground control.

The method of taking the corrected photograph with such a screen is the same as that already described. The observer looking at the photograph through the screens sees four sets of parallel lines on the double screen and a set of lines or slits on the photograph. The original photograph is in the required position for taking a corrected photograph when each line or slit on the original photograph appears to lie evenly between a pair of adjacent parallel lines on the screen, or happens to appear to coincide with one of them.

My invention, therefore, also comprises the further feature that for correcting photographs of hilly or uneven country a composite screen, each part of which bears one or more groups of parallel lines, is used, the parts of the screen being suitably inclined to each other as described.

It will be apparent that by this invention the production of accurately corrected photographs can be effected in a very convenient and expeditious manner.

In the seven accompanying sheets of explanatory drawings:—

Figure 1 is a side elevation, Figure 2 a plan, Figure 3 a cross section on 1, 2, (Figure 1) and Figure 4 an end view showing diagrammatically one form of apparatus constructed in accordance with my invention.

Figure 1a illustrates a sighting device for use with the apparatus.

Referring to Figures 1–4, a base $a$ is formed with a pair of guides $b$. On these guides are mounted the camera $c$ by which the corrected photographs are taken, and a screen holder $h$. The front-end of the camera containing the lens $d$ is carried on the guides by a bracket $e$ which is secured firmly in any convenient position. On the foot of the bracket vertically beneath the view point of the lens is provided a pivot $f$ to which is attached a frame carrying the projector $g$. This frame comprises transverse end members $i$, $j$ ($i$ being connected to the pivot), and longitudinal guide rods $k$, $l$. The end members rest upon the upper surface of the bed $a$.

The projector $g$ comprises a hollow cylindrical body which is carried upon bearing rollers $m$ slidable upon the rods $k$, $l$ and one of the rollers is adapted as shown to form a frictional driving connection with a wheel $n$ on a spindle $o$ which can be rotated by a finger piece $p$. Rotation of the wheel $n$ causes the projector body $g$ to rotate about its axis. Longitudinal movement of the projector is obtained by sliding it with the rollers along the guides $k$, $l$. The interior of the projector is fitted with one or more electric lamp bulbs 25 to provide the required illumination of the photograph to be corrected. Usually the photograph is one of a series on a film which is carried on rollers $q$ mounted on the projector body, the part of the film to be viewed being supported on a flat translucent plate $r$. This plate may bear the axial reference mark to which the datum mark on the photograph is correlated when the photograph is being centred.

The screen holder $h$ is also of cylindrical form, and is carried on rollers $s$ on a bracket $t$ which can be moved to a suitable position on the guides $b$ of the bed $a$. Ordinarily the screen holder is placed as conveniently near as possible to the adjacent end of the projector. Rotation of the screen holder is effected by rotating one of the supporting rollers by a flexible band 26 from a pulley $u$ on a spindle $v$ which is fitted with a finger piece $w$. Preferably the rollers $s$ are attached to a part $t'$ which is slidably adjustable on $t$ and is capable of being secured thereon in any desired position.

Figure 10:
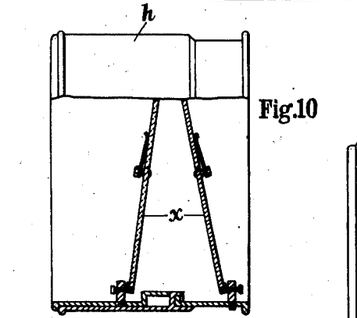
Figure 11:
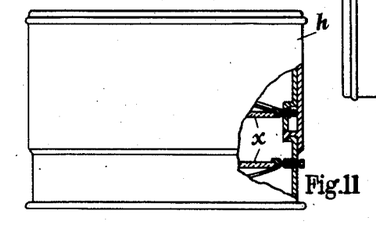
Figure 12:
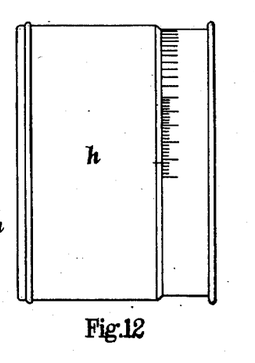

Within the screen holder is carried a transparent screen or two or more screens $x$ ruled with intersecting groups of parallel lines satisfying the conditions already described. When the photograph to be corrected is one of flat country only one screen may be used, and this carries all the reference lines required. But when the photograph is one of hilly country at least two screens are used, and each bears one or more groups of lines. In Figure 10 two screens are shown, each bearing two groups of lines, the two screens being inclined towards each other in the manner already described. When two screens are used the holder is made in two parts as shown in Figures 10–12. Each part carries a screen, and the two parts are relatively rotatable to enable the groups of lines on the screens to be brought into the proper relationship to each other. Any convenient provision is made within the holder for securing the screens in position. The inclination of each screen to the axis of the holder is set by means of a bubble clinometer with the screen holder laid on a truly horizontal table.

Reverting to the camera, this may be of any convenient form, and at the end opposite the lens comprises a frame $y$ on which a photographic plate can be mounted.

Figures 1, 1A:
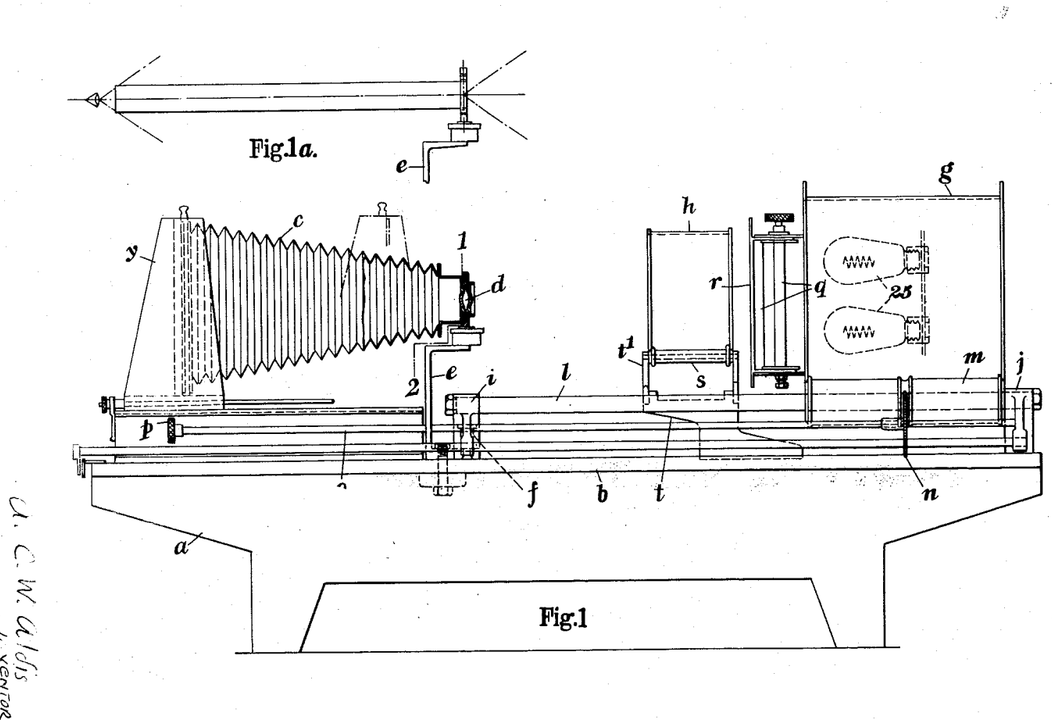
Figure 2:
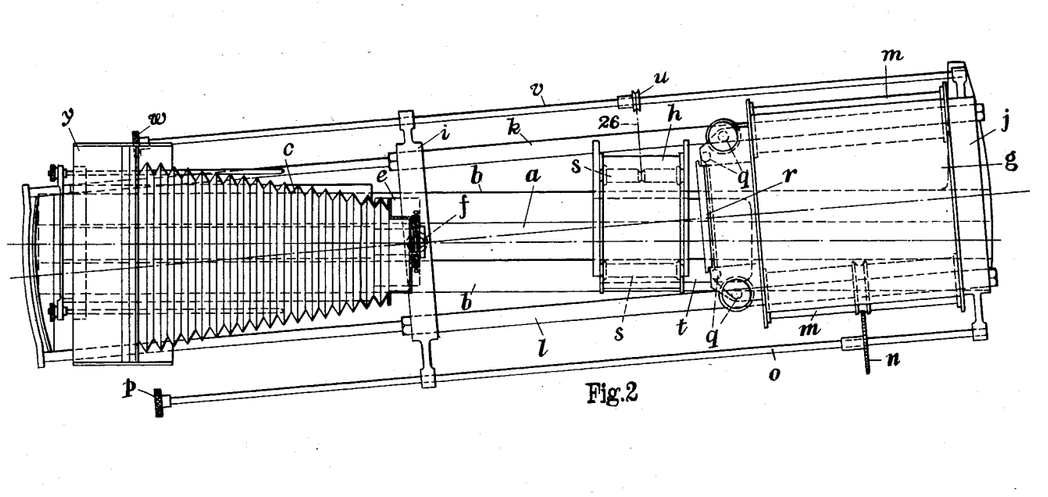
Figure 3:
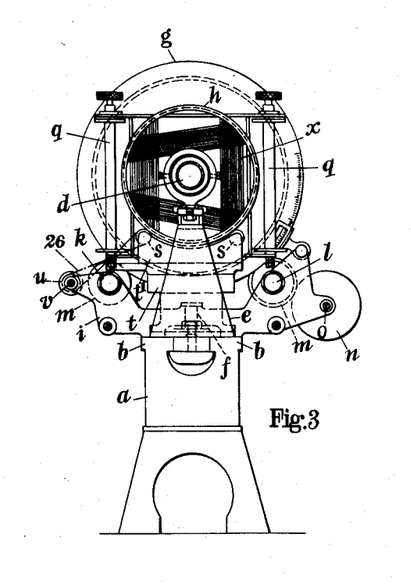
Figure 4:
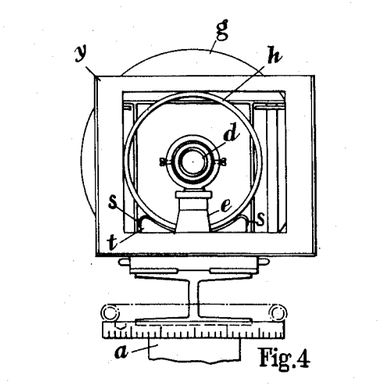
Figure 5:
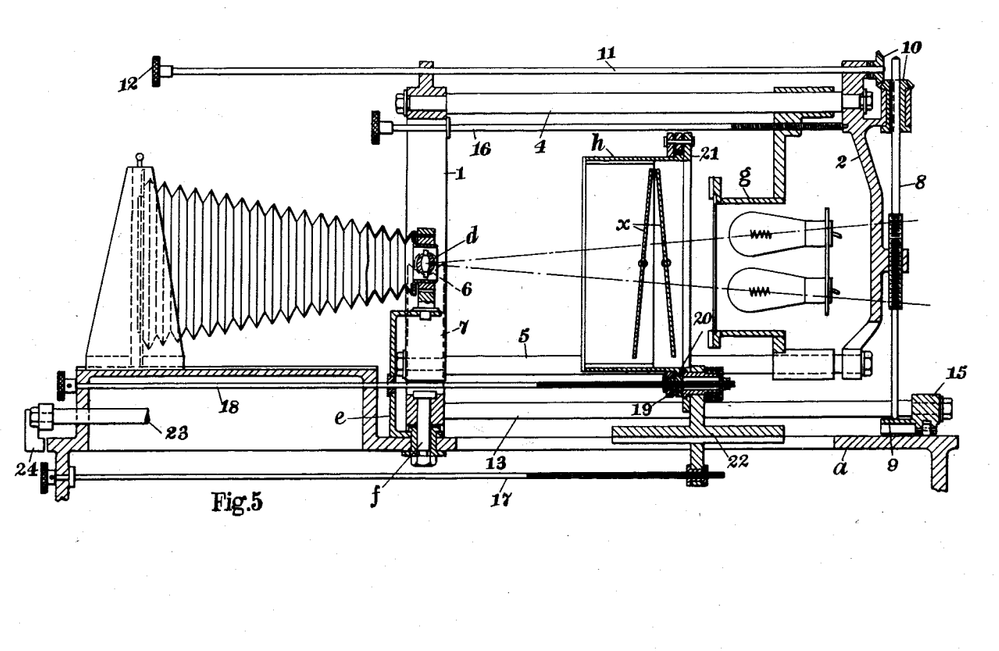
Figure 5 is a longitudinal section, Figure 6 a plan, and Figure 7 an end view showing an alternative construction.

For the purpose of making the initial relative adjustments of the photograph on the projector, and the screen or screens in the screen holder, the camera lens $d$ is removed from the bracket $e$ and in place of the same is inserted the forward end of the viewing instrument shown in Figure 1a. With the aid of this instrument which virtually transfers the observer's eye to the view point of the lens, the lines drawn on the photograph are brought into apparent parallelism with the lines on the screen, this being effected by rotation of either or both of the projector and screen holder about their horizontal axes and rotation of the projector about the vertical axis beneath the view point of the camera lens. After these adjustments have been made the sighting instrument is removed and the camera is brought into action, the photograph then taken on the plate which is carried by the frame $y$ being the required corrected photograph.

Figure 6:
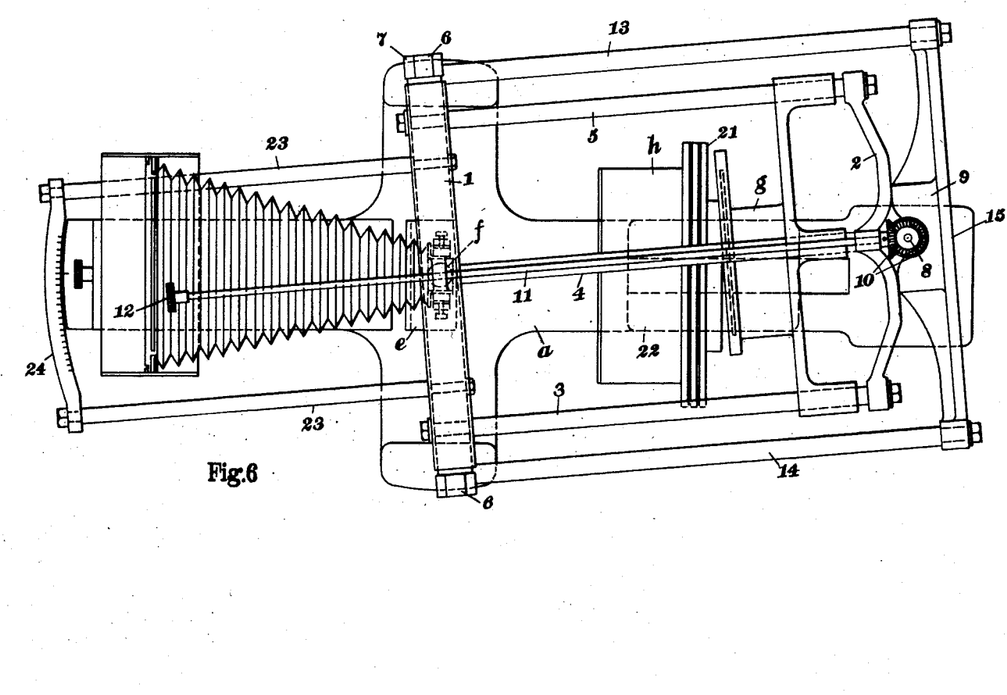
Figure 7:
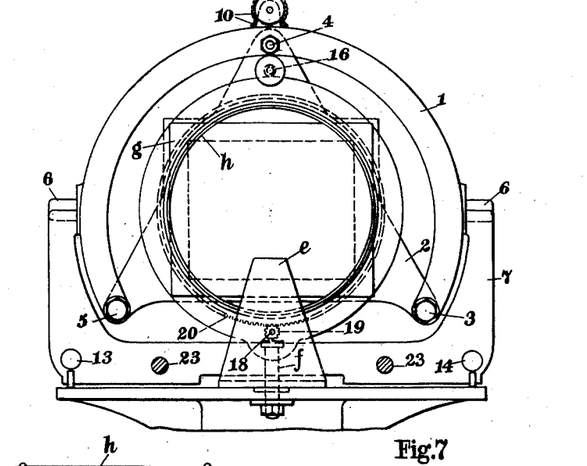
Figure 8:
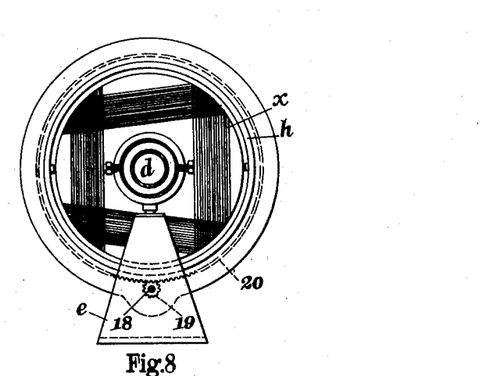
Figure 8 is an end view of the screen shown in Figures 5 and 6.
Figure 9:
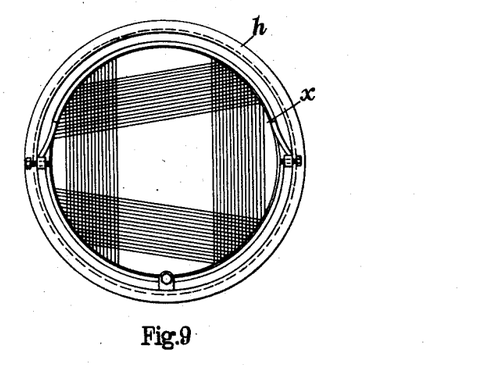
Figures 9–12 illustrate in end elevation, part sectional side elevation, part sectional plan, and full side elevation respectively a screen holder suitable for use with the apparatus shown in Figures 1–4.

In the apparatus shown in Figures 1–4, the projector is rotatable about a horizontal and a vertical axis. For some purposes it is more convenient to dispense with the above described rotational movement of the projector and arrange for its horizontal axis to be swung about the view point in either of two planes which are at right angles to each other. In this case I prefer to employ an apparatus as shown in Figures 5–8. Here the part which carries the projector comprises a front frame 1 and a rear plate 2 joined by side rods 3, 4, 5. The front frame is provided with trunnions 6 which are carried in bearings on a bracket 7. The bracket 7 corresponds to the bracket $i$ (Figures 1 and 2) and can be similarly swung about a vertical axis passing through the view point as determined by the pivot pin $f$ fixed in the base of the bracket $e$ which is secured to the base in any suitable manner and which also carries the lens $d$. The horizontal axis of the trunnions passes through the view point of the lens, and the part carrying the projector can be swung in a vertical plane about this axis, the movement being conveniently effected by a screwed stem 8 which rests on a fixed plate 9 which is associated with the cross bar 15. The screw on the stem engages a nut on the plate 2 and is rotated through bevel wheels 10 from a spindle 11 provided with a finger piece 12. Further the bracket 7 forms part of a frame consisting of side rods 13, 14 and cross bar 15 which can be swung in a horizontal plane on the bed $a$ about the pivot $f$. The plate 9 is secured to the cross bar 15. The projector $g$ can slide on the rods 3, 4, 5, under the action of a screwed spindle 16. A sliding movement can be given to the screen holder $h$ on the bed $a$ by a screwed spindle 17. Rotation of the screen holder about its horizontal axis is effected by a spindle 18 fitted with a pinion 19 which engages a toothed segment 20 on the holder. As it is not necessary in this apparatus to be able to give a complete rotation to the holder a toothed segment subtending a convenient arc is sufficient to afford the necessary rotational movement. The holder is suitably carried on a plate 21 which is secured to a slide 22 movable along the guides in the bed of the apparatus. In this apparatus the position of the pivot $f$ is fixed on the bed, and this feature may if preferred be used in the apparatus shown in Figures 1–4. Further a pair of rods 23 are brought forward from the bracket 7 to a cross member 24 which carries a reference scale as shown in Figure 6. The mode of using the apparatus is essentially the same as has already been described and requires no further description.

The invention is not limited to the form of apparatus above described, and subordinate mechanical or constructional deails can be varied to meet different requirements.

Having thus described my invention what I claim as new and desire to secure by Letters Patent is:—

1. In apparatus for use in the determination of camera tilt and in the preparation of "corrected photographs" in connection with aerial photographic surveys, a screen bearing relatively inclined groups of parallel lines, the relative inclination of the groups being correlated with objects in the original photograph by angular measurements obtained in a ground survey, substantially as described.

2. In apparatus for use in the determination of camera tilt and in the preparation of "corrected photographs" in connection with aerial photographic surveys, a composite screen comprising a plurality of separate and relatively inclined screens each of which bears relatively inclined groups of parallel lines, the relative inclination of the groups of lines being correlated with objects in the original photograph by angular measurements obtained in a ground survey, substantially as described.

3. In apparatus for use in the determination of camera tilt and in the preparation of "corrected photographs" in connection with aerial photographic surveys, the combination comprising a camera, a holder for supporting the "original" photograph, a screen interposed between the camera and holder, said screen bearing relatively inclined groups of parallel lines, and the relative inclination of the groups being correlated with objects in the original photograph by angular measurements obtained in a ground survey, means whereby the screen is slidable along and rotatable about the longitudinal axis of the camera, means whereby the said holder and the camera can be moved angularly in relation to each other about an axis through the view point of the camera lens, and optical means for viewing the screen and the photograph carried by the holder, substantially as described.

4. In apparatus for use in the determination of camera tilt and in the preparation of "corrected photographs" in connection with aerial photographic surveys, the combination comprising a base, a camera mounted at one end of the base, a holder for the original photograph also mounted on the base and movable about an axis through the view point of the camera lens, a screen support situated between the said camera and holder and movable on the base along the longitudinal axis of the camera and rotatable about such axis, a screen mounted on the said screen support, said screen bearing relatively inclined groups of parallel lines, and the relative inclination of the groups being correlated with objects in the original photograph by angular measurements obtained in a ground survey, illuminating means in conjunction with the photograph holder, and removable optical means for viewing the screen and photograph, substantially as described.

In testimony whereof I have signed my name to this specification.

ARTHUR CYRIL WEBB ALDIS.